Aug. 11, 1936.                F. D. STANLEY                2,050,506
BALANCING DEVICE FOR WELL PUMPS
Filed Feb. 14, 1929
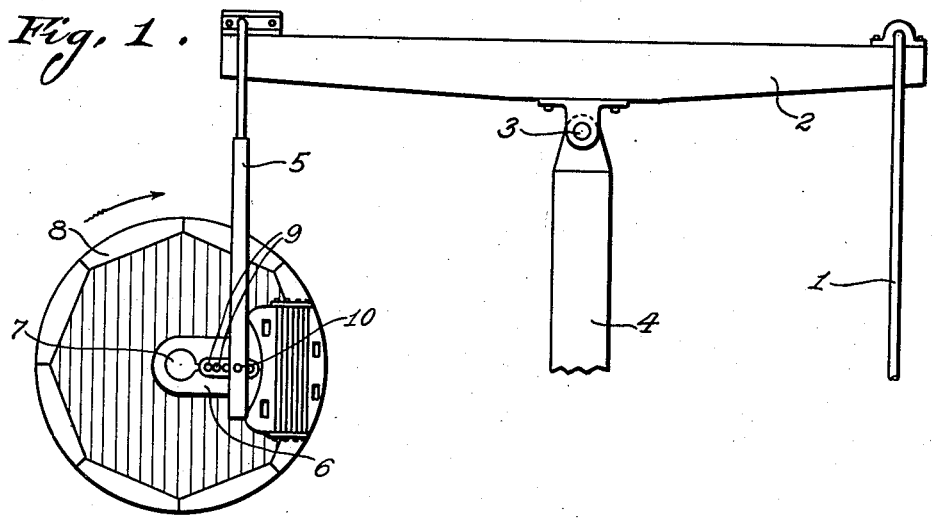
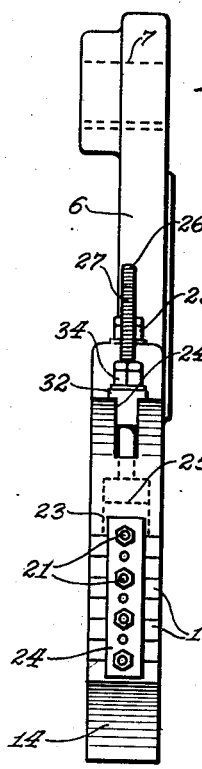
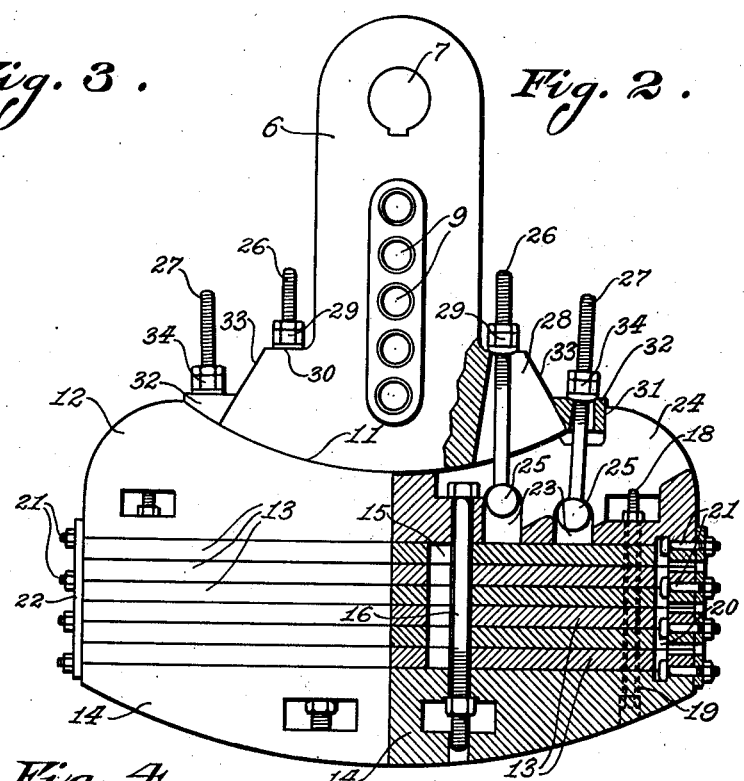
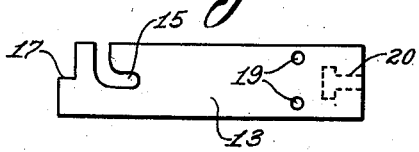
Inventor:
FRED D. STANLEY,
By John N. Bruninga
His Attorney.

Patented Aug. 11, 1936

2,050,506

UNITED STATES PATENT OFFICE 2,050,506

BALANCING DEVICE FOR WELL PUMPS

Fred D. Stanley, Coffeyville, Kans., assignor to The Oil Country Specialties Mfg. Co., Coffeyville, Kans., a corporation of Kansas Application February 14, 1929, Serial No. 339,832

10 Claims. (Cl. 74—591)

This invention pertains to pumping machinery, such as is used for pumping deep wells, more particularly oil wells.

The pumping equipment of a deep well, such as an oil well, which often has a depth as great as three thousand feet, includes a so-called sucker rod extending into the well and carrying the moving element of the pump at its lower end. This sucker rod is hung on one end of a walking beam pivoted near its middle, the other end of which is connected by a pitman to a crank on a shaft rotated by a suitable source of power. On account of the excessive weight of the sucker rod, which must be given a reciprocating up and down movement, considerable energy is lost in starting and stopping the rod itself, and the load upon the rotating parts of the machinery is very uneven. This is due to the fact that the weight of the rod must be lifted during one stroke, while during the succeeding down stroke, the weight of the rod makes it run ahead of the driving power.

One of the objects of this invention, therefore, is to provide novel means for balancing the weight of the sucker rod in an apparatus of this type so as to render the driving effort of the source of power more uniform.

Another object is to provide means for overcoming the great inertia of the rod, which must be stopped and started at the end of each stroke.

Another object is to provide for so balancing the device which will be adjustable in a simple manner so that any desired balancing effect may be obtained.

In operating a pump of this type, it has been found that a long sucker rod has action somewhat similar to that of a cable under like conditions. During the power or lifting stroke, the rod is required to lift a great weight of liquid and, in addition, its own weight. Accordingly, the rod stretches under this load. At the end of the stroke, when the liquid load is removed and the rod starts downwardly, it again contracts to its normal length before starting its downward movement. There is thus a lag in the action of the rod due to its elasticity. This causes the effort of the rod to be applied to the load at a different time from that at which the driving effort is applied to the rod. Accordingly, the action of the rod on its load is slightly out of phase with the action of the driving power on the rod. In order to compensate for this effect, it is desirable to have means for adjusting the balancing device so as to vary the phase of its action with respect to that of the driving power.

Another object of this invention, therefore, is to provide balancing means which can be adjusted so as to lag or lead the driving power in the time phase of its action.

Another object is to provide means for applying balancing devices to the crank which drives the walking beam in such a manner as to render the load on a driving source substantially uniform.

Another object is to provide an improved form of balancing device which will be adjustable to meet the conditions required.

Further objects will appear from the following description, taken in connection with the accompanying drawing, in which—

Figure 1 is a diagrammatic view, illustrating the pumping equipment of a well provided with balancing means in accordance with this invention;

Figure 2 is an enlarged end view, partly in section, of the crank with the balancing device applied thereto;

Figure 3 is a side or edgwise view of the crank shown in Figure 2; and

Figure 4 is a detail of one of the counterweight sections.

Referring to the drawing, 1 designates the sucker rod, which extends into the well, not shown. The rod 1 is hung on a walking beam 2 pivoted at 3 on a Samson post 4 and whose other end is connected by a pitman 5 with a crank 6 on a shaft 7, which may also carry a band wheel 8. The shaft 7 may be mounted in suitable bearings of any kind and may either be driven by a belt applied to the band wheel 8 or it may be incorporated in any other suitable manner with the source of driving power.

The crank 6 may be provided with a plurality of sockets 9 adapted to receive the crank pin 10 so that the effective radius of the crank may be adjusted by moving the pin to any of the sockets 9.

The end of the crank 6 is formed with a seat 11 preferably arcuate in form, having its center at the center of the shaft 7. A composite counter-weight is arranged to be attached to the crank 6. This weight comprises a head unit 12 having a seat fitted to engage the seat 11 on the crank and a series of detachable weight sections 13 and 14 arranged to be secured to the head section 12. The sections 13 are provided with angle slots 15 adapted to receive clamping bolts 16. The inner ends of the sections 13 are provided with an offset or dove tail 17, such that the offsets of two adjacent sections placed end to end will fit each other. The sections are assembled by slipping the slots 15 over the bolts 16 and bringing the offset ends 17 into matching relation with one another. Additional clamping bolts 18 are then passed through perforations 19 to secure the entire series in assembled relation. The ends of the sections have sockets 20 cast therein adapted to receive bolts 21 passing through perforations in an aligning plate 22, which retains the sections in alignment.

The head unit 12 is provided at each side thereof with a plurality of internal sockets 23 communicating with a central slot 24 in the body of the unit. The sockets 23 are adapted to receive the heads 25 of T-head bolts 26 and 27. The bolt 26 may be passed through a slot 28 in the end of the crank 6 and is provided with a nut 29 adapted to engage a shoulder 30 on the crank. By pulling up the nut 29, the bolt 26 is adjustable to hold the counter-weight on the seat 11.

The head unit 12 is provided with a shoulder 31 adapted to receive a wedge block 32 having a bevel face adapted to co-operate with a bevel face 33 on the crank 6. The bolt 27 passes through a perforation in the wedge block 32 and has a nut 34 adapted to force said wedge block into the gap between the shoulder 31 of the head unit and the face 33 of the crank. There are two wedge blocks 32, one on each side of the crank; and, by relative adjustment of the side thrust of these two blocks, the counter-weight may be shifted along the seat 11. During such adjustment the bolts 26 adjust themselves to the movement of the counter-weight by lateral movement in the slots 28. This adjustment provides that the counter-weight may be shifted back and forth so as to lead or lag with respect to the crank pin 10.

In the operation of this device, the weight of the counter-weight may be adjusted by assembling the necessary number of sections 13 on the head 12. The assembled counter-weight is then mounted on the crank pin by adjustment of the bolts 26. It will be noted that the T-heads of these bolts rest in internal sockets in the head 12, said sockets being entirely enclosed so that accidental disengagement of these bolts with the head is impossible. The wedge blocks 32 are adjusted by means of the nuts 34 so as to shift the counter-weight along the seat 11 in order to bring it into alignment with the crank pin 10, or to adjust it to any desired degree of lead or lag.

As the pump operates, the rod 1 is reciprocated by the action of the crank 6 through the walking beam 2. The counter-weight, being mounted on the crank, moves so as to descend when the rod 1 rises and to rise when the rod descends. Accordingly, the weight of the rod may be balanced by the weight of the counter-weight. Furthermore, any desired portion of the weight of the liquid lifted by the pump may be balanced by proper adjustment of the counterweight. As the counter-weight rotates, it gathers momentum in a manner similar to the momentum of a flywheel. This momentum is applied through the walking beam to the rod 1 at times when it is necessary to reverse the movement of the rod. In bringing the rod to rest at the end of a stroke, the rod transfers its kinetic energy to the counter-weight so as to increase its speed slightly and to increase its momentum accordingly. At the beginning of a new stroke, the kinetic energy of the counter-weight is transferred back to the rod and is used in accelerating the latter to its proper speed. This give and take of energy between the rod and the counter-weight relieves the source of driving power of the necessity of providing energy for accelerating the rod at the beginning of each stroke. Accordingly, power is saved in the operation of the pump.

In order to overcome the above-described effect, due to the elasticity of the rod 1, which changes the phase of its action with respect to that of the driving source, the counter-weight may be adjusted to lead or lag with respect to the crank pin 10 so that its compensating effort will be applied a moment before or after that of the crank is applied to the walking beam. In this way the effect of the elasticity of the rod can be overcome or compensated for to a large extent.

It will be seen, therefore, that this invention provides novel and effective means for rendering the action of a deep well pump uniform in its demands upon the source of power. Not only the weight of the rod can be compensated for, but its inertia can be overcome by the momentum of the counter-weight. Furthermore, the effect of elasticity of the rod is taken care of by the possibility of adjusting the counter-weight angularly with respect to the crank. The arrangement of a series of detachable weight sections makes it possible to adjust the action of the counter-weight with great nicety to the requirements of any particular well.

While this invention is intended particularly for the operation of deep wells, such as oil wells, it may be applied under proper circumstances to other similar devices. It is further understood that certain features of construction and operation may be useful without reference to other features of construction and operation and that the employment of such sub-combinations is contemplated by this invention and is within the scope of the appended claims. It is further obvious that various changes may be made, within the scope of the appended claims, in the details of operation and construction without departing from the spirit of this invention. It is, therefore, to be understood that this invention is not to be limited to the specific details shown or described.

Having thus described the invention, what is claimed is:

1. In a device of the character described having a shaft, a crank on said shaft having a seat extending across the end thereof, a counter-weight mounted on said seat, and a side thrust member operable to shift said weight lengthwise along said seat.

2. In a device of the character described having a shaft, a crank on said shaft having a seat at the end thereof, a counter-weight engaging said seat and having an internal socket, a fastening member having a head engaging said socket and connected with said crank to hold said weight on said seat, and means for positively shifting said weight along said seat.

3. In a device of the character described having a shaft, a crank on said shaft having a seat at the end thereof, a counter-weight engaging said seat, means for holding said weight on said seat, a wedge block engaging said weight, and means for moving said block to shift said weight along said seat.

4. In a device of the character described having a shaft, a crank on said shaft having a seat at the end thereof, a counter-weight engaging said seat and having an internal socket, a T-head bolt engaging said socket and adjustable to hold said weight on said seat, a wedge block engaging said weight, and means for moving said block to shift said weight along said seat.

5. In a device of the character described having a shaft, a crank on said shaft having a seat at the end thereof, and a counter-weight comprising, a head unit engaging said seat, means for holding said unit on said seat, a plurality of detachable weight sections, means for securing said sections to said unit and means for moving said head unit and sections along said seat.

6. In a device of the character described having a shaft, a crank on said shaft having a seat at the end thereof, and a counterweight comprising, a head unit engaging said seat, said unit having an internal socket, a fastening element having a head engaging said socket and adjustable to hold said unit on said seat, a plurality of detachable weight sections, means for securing said sections to said unit and means for moving said head unit and sections along said seat.

7. In a device of the character described having a shaft, a crank on said shaft having a seat at the end thereof, and a counter-weight comprising, a head unit engaging said seat, said unit having an internal socket, a bolt having a T-head engaging said socket and adjustable to hold said unit on said seat, a plurality of detachable weight sections, means for securing said sections to said unit and means for moving said head unit and sections along said seat.

8. In a device of the character described having a shaft, a crank on said shaft having an arcuate seat at the end thereof, a counter-weight head mounted on said seat, detachable weight sections, means for holding said sections on said head in fixed relative position thereto, and means for adjusting said counter-weight head and sections as a unit along said arcuate seat.

9. In a device of the character described having a shaft, a crank on said shaft having an arcuate seat at the end thereof, a counter-weight head having a complementary arcuate seat, means for fastening said counter-weight head to said crank with the arcuate seats cooperating, and means for positively moving said counter-weight head relative to said crank along said seat.

10. In a device of the character described having a shaft, a crank on said shaft having an arcuate seat at the end thereof, a counter-weight head having a complementary arcuate seat, means for fastening said counter-weight head to said crank with the arcuate seats cooperating, means for positively moving said counter-weight head relative to said crank along said seat, detachable counter-weight sections, and means for holding said sections on said head against movement relative thereto.

FRED D. STANLEY.